(12) United States Patent  
Chao et al.

(10) Patent No.: US 7,226,161 B2
(45) Date of Patent: Jun. 5, 2007

(54) EYEGLASS DEVICE

(75) Inventors: David Yinkai Chao, Chiayi (TW); Pin Chou, Chiayi (TW); Chien Ho Lin, Chiayi (TW); Hsien Tsung Chang, Banciao (TW)

(73) Assignee: Contour Optik Inc., Chiayi (TW)

( * ) Notice: Subject to any disclaimer, the term of this patent is extended or adjusted under 35 U.S.C. 154(b) by 169 days.

(21) Appl. No.: 10/882,186

(22) Filed: Jul. 2, 2004

(65) Prior Publication Data

US 2005/0001976 A1    Jan. 6, 2005

(30) Foreign Application Priority Data

Jul. 3, 2003    (TW) .............................. 92212281 U (51) Int. Cl.
G02C 9/00    (2006.01)
(52) U.S. Cl. .......................................... 351/47; 351/57
(58) Field of Classification Search ................. 351/47, 351/57, 48, 58
See application file for complete search history.

(56) References Cited

U.S. PATENT DOCUMENTS 6,174,058 B1 *   1/2001   Hsiao ......................... 351/155
6,354,703 B1 *   3/2002   Sadler ......................... 351/57
6,382,787 B1 *   5/2002   Xie ............................. 351/47
6,412,942 B1     7/2002   McKenna et al. ............ 351/47
6,729,722 B1 *   5/2004   Park ............................ 351/47
6,767,094 B2 *   7/2004   Wang .......................... 351/57
6,869,180 B1 *   3/2005   Kidouchim .................. 351/47

* cited by examiner

*Primary Examiner*—Huy Mai
(74) *Attorney, Agent, or Firm*—Birch, Stewart, Kolasch & Birch, LLP (57) ABSTRACT

An eyeglass device includes a primary frame and an auxiliary frame for receiving two primary lenses and two auxiliary lenses respectively. The primary frame includes two brow portions and two primary magnetic members disposed respectively on the two brow portions or on top edges of the two primary lenses. Each of the primary magnetic members has a magnetic surface facing upwards or downwards or rearwards. The auxiliary frame includes two brow portions and two auxiliary magnetic members disposed respectively on the two brow portions or on top edges of the two auxiliary lenses to be mutually magnetically attachable with the two primary magnetic members.

18 Claims, 12 Drawing Sheets

EYEGLASS DEVICE

This Non-provisional application claims priority under 35 U.S.C. § 119(a) on Patent Application No(s). 092212281 filed in Taiwan on Jul. 3, 2003, the entire contents of which are hereby incorporated by reference.

BACKGROUND OF THE INVENTION

1. Field of the Invention

The present invention relates generally to an eyeglass device, and more particularly to a magnetically combined eyeglass device, which is structurally secured to avoid accidental detachment and is simple for assembly.

2. Description of the Related Art

A conventional eyeglass device as disclosed in U.S. Pat. No. 6,412,942 is comprised of a primary frame and an auxiliary frame attached magnetically to the primary frame. The primary frame used as common eyeglass device includes two rims, two lenses embedded respectively into the two rims, and two temples mounted at two lateral sides of the rims. The auxiliary frame includes two rims and two lenses, being magnetically attached to a front side of the primary frame in a specific condition for blinding strong light or for other additional usage. Each of the rims of the primary and auxiliary frames is made of a material, which is magnetic either itself or is attractable by magnetism. Accordingly, the primary and auxiliary frames can be magnetically combined together rather than conventional mechanical connecting manners, such as coupling and engagement, such that the eyeglass device is convenient for use.

However, the conventional eyeglass device still includes four drawbacks as follows.

1. Because each of the rims of the primary and auxiliary frames is of radian in appearance, the rim is subject to deformation caused by improper use, and further, the primary and auxiliary frames may frequently fail to be tightly attached with each other and may even cause their accidental detachment.

2. The scope of applications of such eyeglass device is limited, e.g. it fails to be applied to currently popular rimless eyeglass device.

3. Because the rims of such eyeglass device are made of materials, which are magnetic themselves or attractable by magnetism, the production cost is high and such materials are not diversified but limited.

4. Such eyeglass device has to be completely finished at the time of production and fail to be further processed by the retainers or the users subject to their requirement, thereby being inflexible for use.

SUMMARY OF THE INVENTION

The primary objective of the present invention is to provide a magnetically combined eyeglass device, which is structurally secured to avoid accidental detachment.

The other objective of the present invention is to provide a magnetically combined eyeglass device, which is applicable to rimless, semi-rim, and full-rim eyeglass devices.

Another objective of the present invention is to provide a magnetically combined eyeglass device, which is flexible for simple assembly subject to the requirement of the retainer or user.

The foregoing objectives of the present invention are attained by the eyeglass device, which is comprised of a primary frame and an auxiliary frame. The primary frame includes a bridge, two brow portions extending outwards respectively from two ends of the bridge, two temples extending rearwards respectively from two distal ends of the brow portions, and two primary magnetic members disposed respectively on the two brow portions. Each of the primary magnetic members has a magnetic surface facing upwards or downwards or rearwards. The auxiliary frame includes a bridge, two brow portions extending outwards respectively from two ends of the bridge, and two auxiliary magnetic members disposed respectively on the two brow portions. Each of two auxiliary magnetic members has a magnetic surface corresponding to the magnetic surface of the primary magnetic member of the primary frame. Accordingly, the two magnetic surfaces of the primary and auxiliary magnetic members can be magnetically attachable to each other, such that the primary and auxiliary frames are securely magnetically combined together.

Alternatively, the eyeglass device provided by the present invention is comprised of two primary lenses, a bridge connected between the two primary lenses, two temples mounted respectively on two ends of the two primary lenses, two primary magnetic members disposed respectively on top edges of the two primary lenses respectively by their primary props, two auxiliary lenses interconnected together by a bridge, and two auxiliary magnetic members disposed on top edges of the two auxiliary lenses respectively by their auxiliary props to be magnetically attached with the two primary magnetic members.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
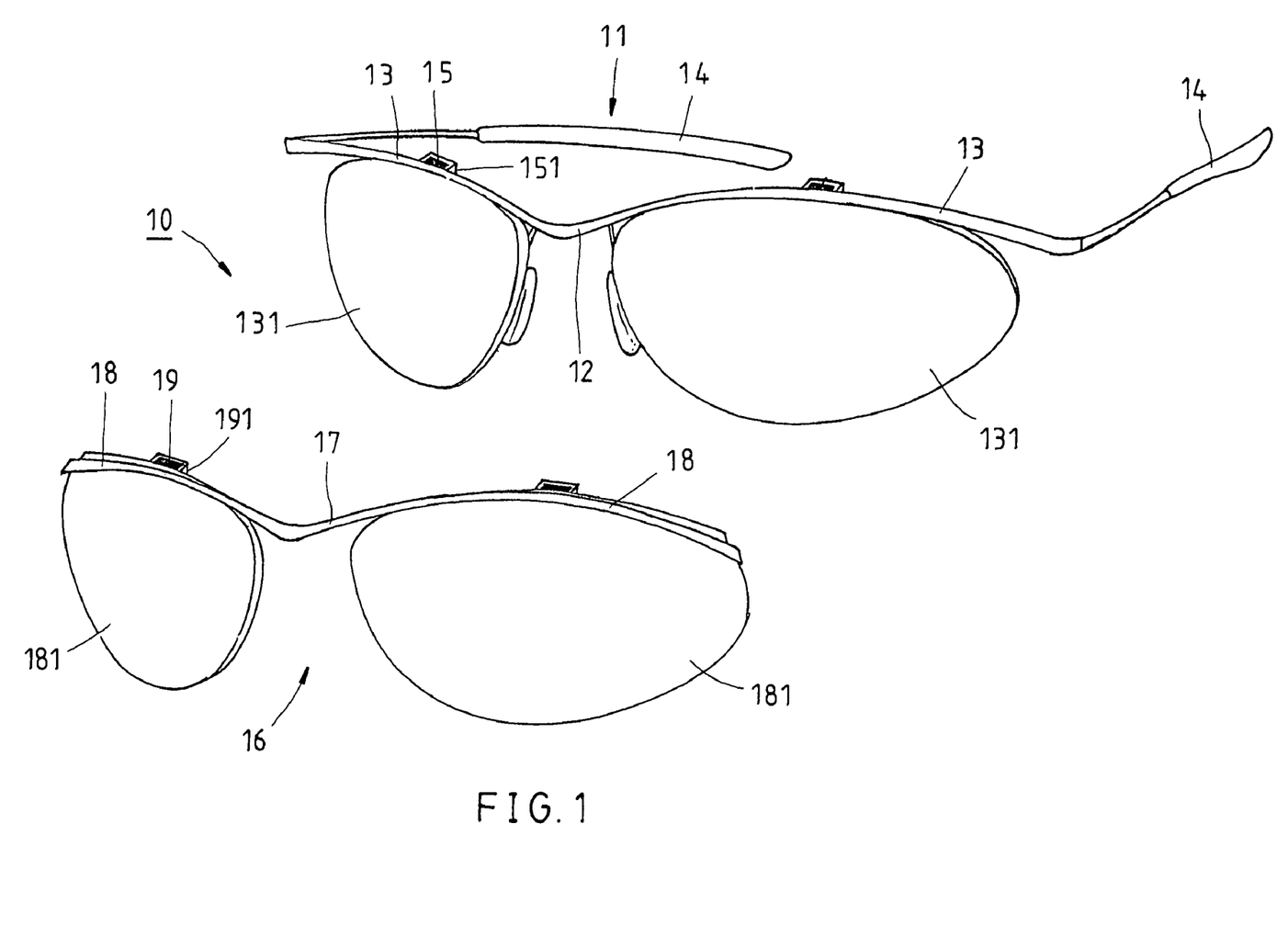
FIG. 1 is an exploded view of a first preferred embodiment of the present invention.
Figure 2:
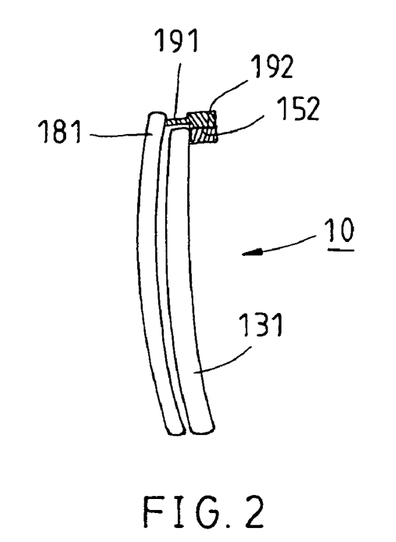
FIG. 2 is a sectional view of the first preferred embodiment of the present invention.

Referring to FIGS. 1 and 2, an eyeglass device 10 constructed according to a first preferred embodiment of the present invention is comprised of a primary frame 11 and an auxiliary frame 16.

The primary frame 11 includes a bridge 12, two brow portions 13 extending outwards respectively from two ends of the bridge 12, two lenses 131 connected respectively below the two brow portions 13, two temples 14 extending rearwards respectively from two distal ends of the brow portions 13, and two primary magnetic members 15 disposed respectively on the two brow portions 13 by two props 151. Each of the two props 151 extends rearwards from the two brow portions 13. Each of the two primary magnetic members 15 has a magnetic surface 152 facing upwards.

The auxiliary frame 16 includes a bridge 17, two brow portions 18 extending outwards respectively integrally from two ends of the bridge 17, two lenses 181 connected respectively below the two brow portions 18, and two auxiliary magnetic members 19 disposed on the two brow portions 18 by two props 191. Each of the two props 191 extends rearwards from the two brow portions 18. Each of the two auxiliary members 19 has a magnetic surface 192 facing downwards and corresponding to the magnetic surface 152 of the primary magnetic members 15.

The primary and auxiliary magnetic members 15 and 19 are made of magnetic materials, such that the magnetic surfaces 152 and 192 are magnetically attachable to each other to magnetically combine the primary frame 11 and the auxiliary frame 16 together. Because the primary and auxiliary magnetic members 15 and 19 are combined together two-point by two-point, even if the two frames 11 and 16 are deformed for long time of use, as long as the primary and auxiliary magnetic members 15 and 19 are magnetically attractable, the two frames 11 and 16 can still be securely combined together. In addition, the two frames 11 and 16 can be made of any proper materials, not such limited like the prior art, and reduce the production cost.

It is to be noted that both of the primary and auxiliary magnetic members 15 and 19 are not necessarily made of magnetic materials, i.e. either one of them is made of a magnetic material and the other can be made of a material, which can be made of any material attractable by magnetism, such as iron or alloy or plastic. Besides, the magnetic member and the prop may be formed in one piece; that is, the prop itself may be made of magnetic materials.

Figure 3:
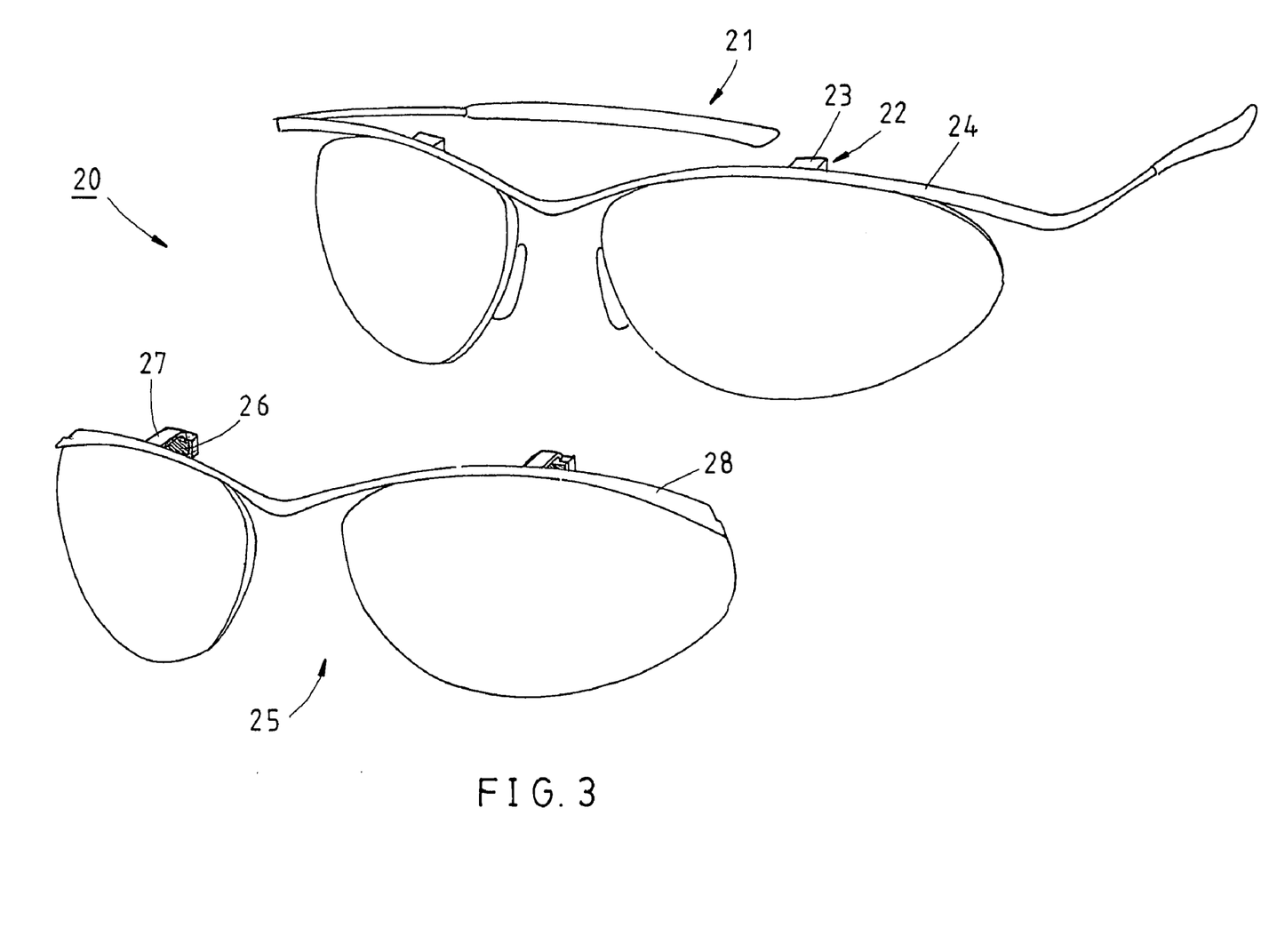
FIG. 3 is an exploded view of a second preferred embodiment of the present invention.
Figure 4:
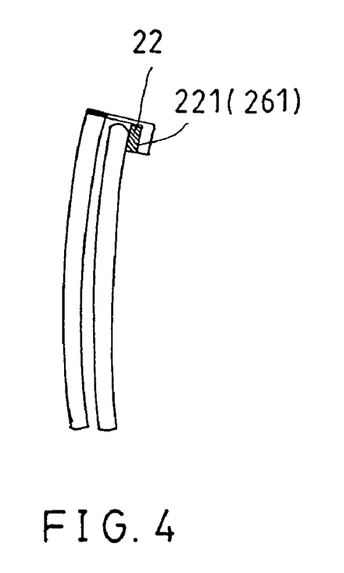
FIG. 4 is a sectional view of the second preferred embodiment of the present invention.

Further, the arrangement of the primary and auxiliary frames and the props can be diversified. Referring to FIGS. 3 and 4, the eyeglass device 20 constructed according to a second preferred embodiment of the present invention is similar to the aforementioned preferred embodiment. As shown in FIGS. 3-4, the eyeglass device includes a primary frame 21 and an auxiliary frame 25. The primary magnetic members 22 are respectively disposed on the brow portions 24 of the primary frame 21 by a respective prop 23. The magnetic surfaces 221 of the primary magnetic members 22 face rearwards. The auxiliary magnetic members 26 are respectively disposed on the brow portions 28 of the auxiliary frame 25 by a respective prop 27. The props 27 of the auxiliary frame 25 extend rearwards for a length and then downwards, and the magnetic surfaces 261 of the auxiliary magnetic members 26 face forwards. Accordingly, the primary and auxiliary frames 21 and 25 can be more securely magnetically combined together.

Figure 5:
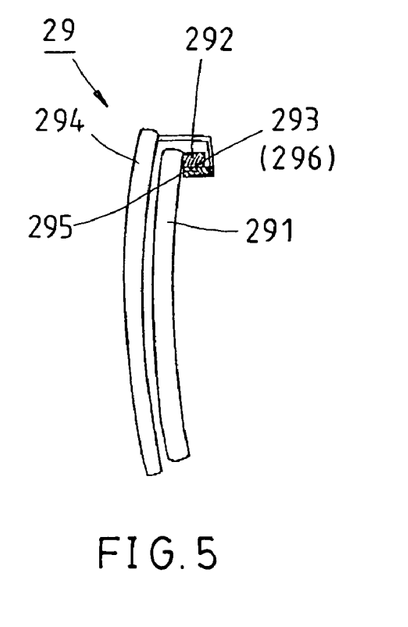
FIG. 5 is a sectional view of a third preferred embodiment of the present invention.

Referring to FIG. 5, the eyeglass device 29 constructed according to a third preferred embodiment of the present invention is similar to the aforementioned preferred embodiments. The magnetic surfaces 293 of the primary magnetic members 292 face downwards, and the magnetic surfaces 296 of the auxiliary magnetic members 295 face upwards. Accordingly, the primary and auxiliary frames 291 and 294 can be more securely magnetically combined together.

Figure 6:
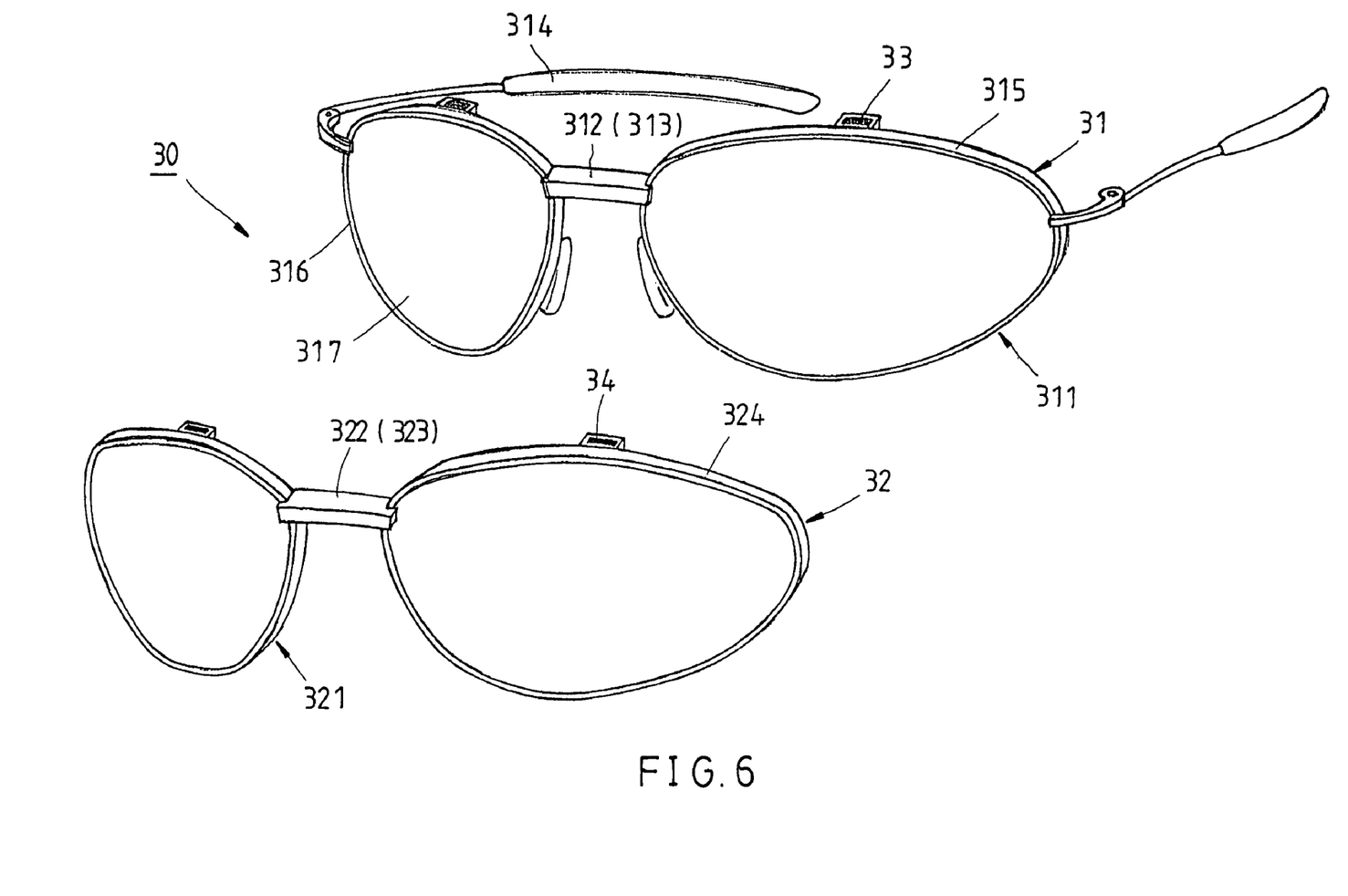
FIG. 6 is an exploded view of a fourth preferred embodiment of the present invention.

The present invention can be applied to various types of eyeglass devices. Referring FIG. 6, the eyeglass device 30 constructed according to a fourth preferred embodiment of the present invention is comprised of a primary full-rim frame 31 and an auxiliary full-rim frame 32. The primary full-rim frame 31 includes two lens portions 311, a bridge portion 312 (embodied as the bridge 313) located between the two lens portions 311 for interconnecting the two lens portions 311, two temples 314 mounted respectively behind the two lens portions 311, two brow portions 315 extending respectively from the bridge portion 312 towards the two lens portions 311, and two primary magnetic members 33 disposed respectively on the two brow portions 315. Each of the primary magnetic members 33 is provided with a magnetic surface facing upwards. Each of the two lens portions 311 has a rim 316 encircling a lens 317, and the brow portion 315 belongs to the rim 316. The auxiliary frame 32 includes two lens portions 321, a bridge portion 322 (embodied as the bridge 323) located between the two lens portions 321 for interconnecting the two lens portions 321, two brow portions 324 extend respectively from the bridge portion 322 towards the two lens portions 321, and two auxiliary magnetic members 34 disposed respectively on the two brow portions 324. Each of the two auxiliary magnetic members 34 has a magnetic surface facing downwards and magnetically attachable to the magnetic surface of the primary magnetic member 33, such that the primary and auxiliary frames 31 and 32 can be magnetically combined together.

Figure 7:
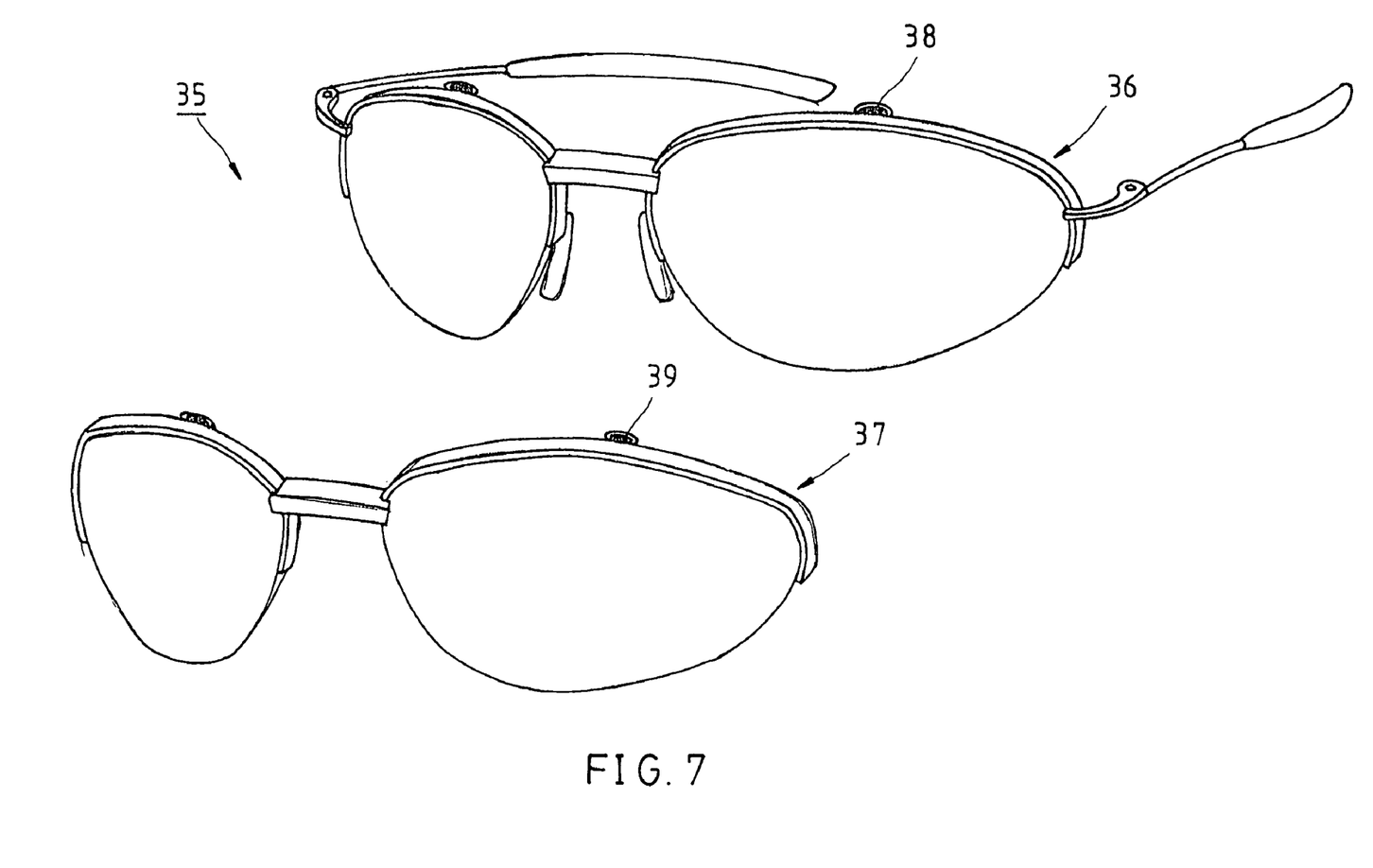
FIG. 7 is an exploded view of a fifth preferred embodiment of the present invention.

Referring to FIG. 7, the eyeglass device 35 constructed according to a fifth preferred embodiment of the present invention is similar to the aforementioned preferred embodiment but different only by that the primary and auxiliary frames 36 and 37 on which the primary and auxiliary magnetic members 38 and 39 are respectively mounted are semi-rimed.

Figures 8, 9:
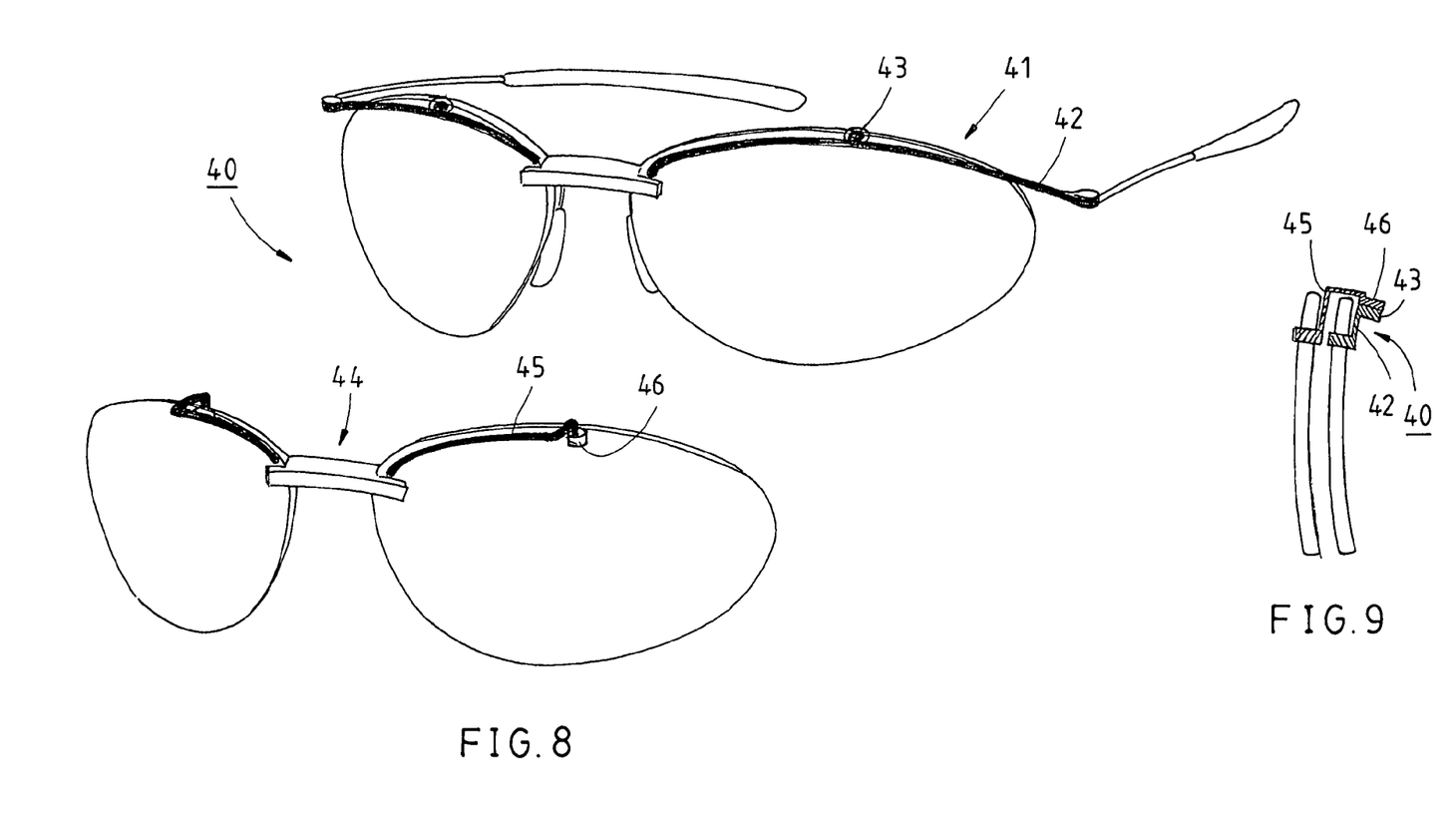
FIG. 8 is an exploded view of a sixth preferred embodiment of the present invention.
FIG. 9 is a sectional view of the sixth preferred embodiment of the present invention.

Referring to FIGS. 8 and 9, the eyeglass device 40 constructed according to a sixth preferred embodiment of the present invention shows that the brow portions 42 and 45 of the primary and auxiliary frames 41 and 44 are particularly designed. The primary and auxiliary magnetic members 43 and 46 are respectively disposed on the brow portions 42 and 45 of the primary and auxiliary frames 41 and 44.

As a matter of fact, only if the primary and auxiliary magnetic members, which are disposed respectively on the brow portions, are magnetically attractable to each other, no matter how the types of the eyeglass device are diversified is included within the claimed scope of the present invention. In addition, the primary and auxiliary magnetic members can be directly inlaid into the brow portions of the primary and auxiliary frames and merely enable the corresponding magnetic surfaces to be exposed outside for being mutually magnetically attached with each other.

Figure 10:
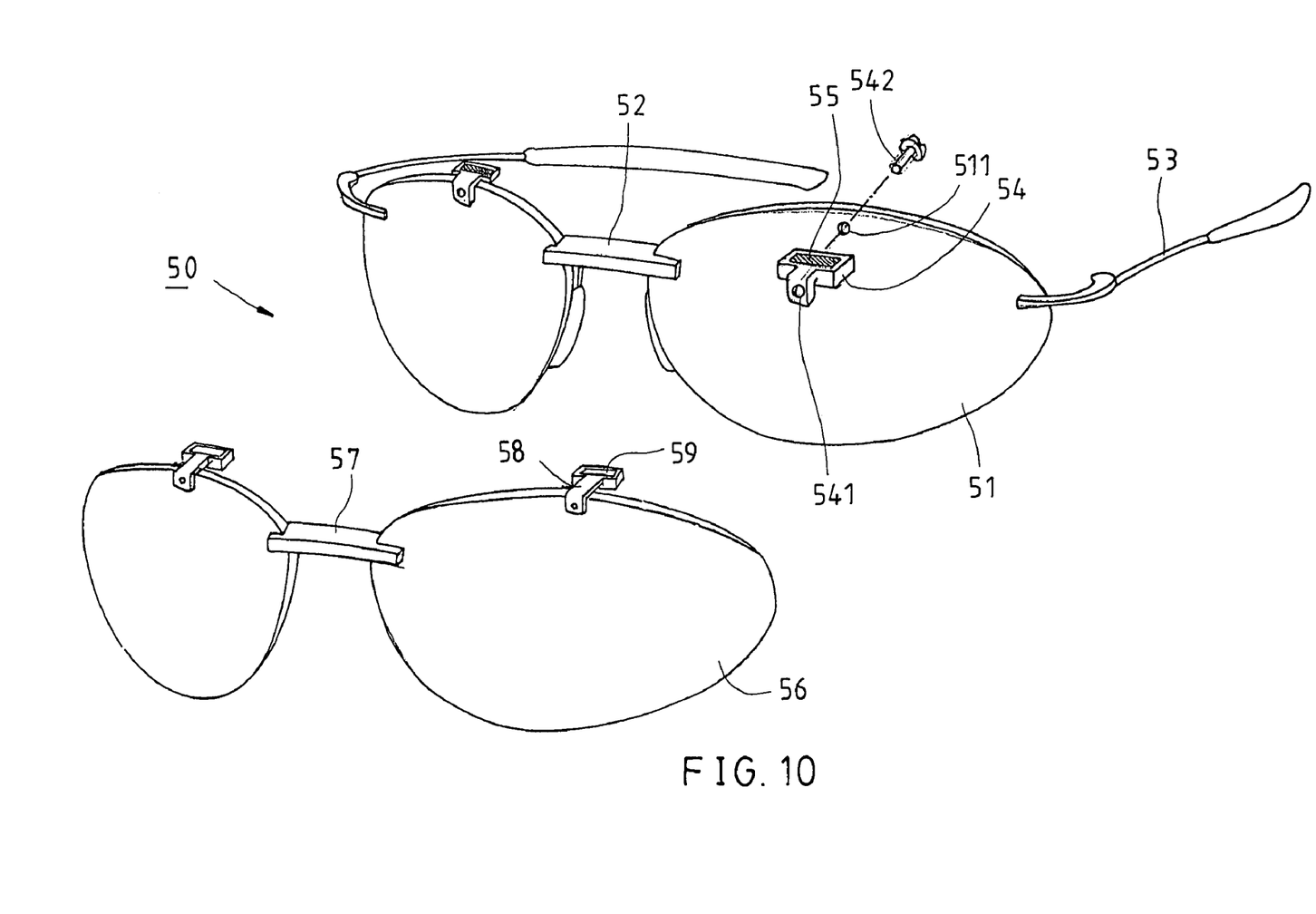
FIG. 10 is an exploded view of a seventh preferred embodiment of the present invention.
Figure 11:
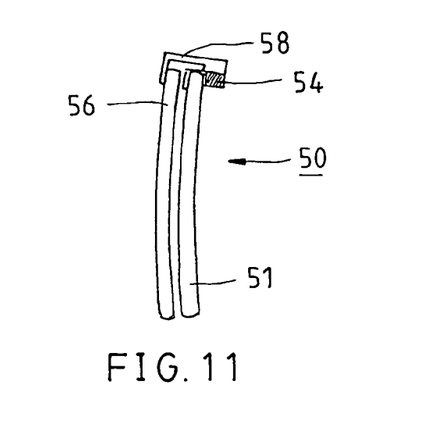
FIG. 11 is a sectional view of the seventh preferred embodiment of the present invention.

Referring to FIGS. 10 and 11, the eyeglass device 50 constructed according to a seventh preferred embodiment of the present invention is comprised of two primary lenses 51, a bridge 52 connected between the two primary lenses 51, two temples 53 extending rearwards respectively from the two primary lenses 51, two primary magnetic members 55 disposed respectively on the two primary lenses 51 by two primary props 54, two auxiliary lenses 56, a bridge 57 connected between the two auxiliary lenses 56, and two auxiliary magnetic members 59 disposed respectively on the two auxiliary lenses 56 by two auxiliary props 58. Each of the two primary lenses has a through hole 511 formed at a top edge thereof and each of the two primary props 54 has a screw hole 541. Two bolts 542 are inserted respectively through the two through holes 511 and the screw holes 541 to secure the two primary magnetic members 55 respectively at upper rear sides of the two primary lenses 51. Likewise, the two auxiliary magnetic members 59 are disposed on the auxiliary lenses 56 by the same manner as the two primary magnetic members 55. Accordingly, the primary and auxiliary magnetic members 55 and 59 are magnetically attachable to combine the primary and auxiliary lenses 51 and 56 together. The eyeglass device 50 is not only structurally secure but also easy for processing and assembly. Common retainer or user can work on the raw eyeglass device with the props, the magnetic members, and the bolts to produce the eyeglass device, such that it is quite convenient for the retainers and users.

Figure 12:
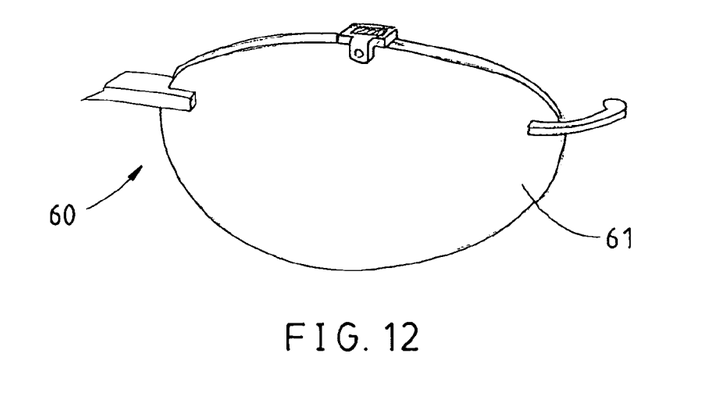
FIG. 12 is a partial perspective view of an eighth preferred embodiment of the present invention.

In addition, the primary magnetic members 60 of an eighth preferred embodiment of the present invention can be alternatively mounted right at upper sides of the primary lenses 61, as shown in FIG. 12.

Figure 13:
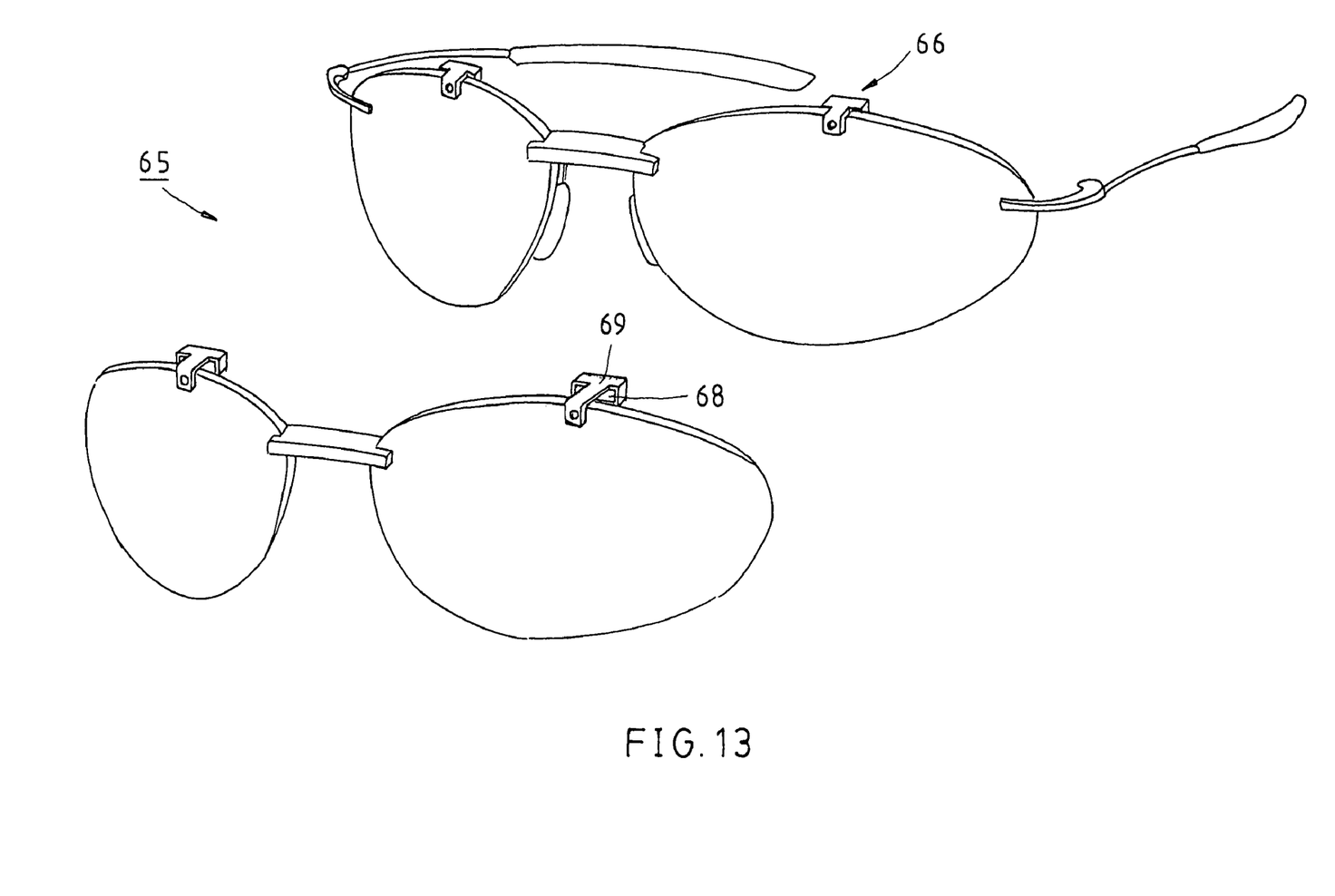
FIG. 13 is an exploded view of a ninth preferred embodiment of the present invention.
Figure 14:
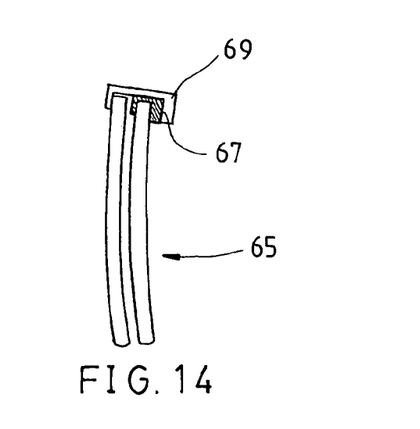
FIG. 14 is a sectional view of the ninth preferred embodiment of the present invention.

Further, the arrangement of the primary and auxiliary magnetic members and the props can be diversified. As shown in FIGS. 13 and 14, the eyeglass device 65 constructed according to a ninth preferred embodiment of the present invention shows that the magnetic surfaces 67 of the primary magnetic members 66 face rearwards, and the magnetic surfaces of the auxiliary magnetic members 68 face forwards. Accordingly, the eyeglass device 65 can be more securely magnetically combined together.

Figure 15:
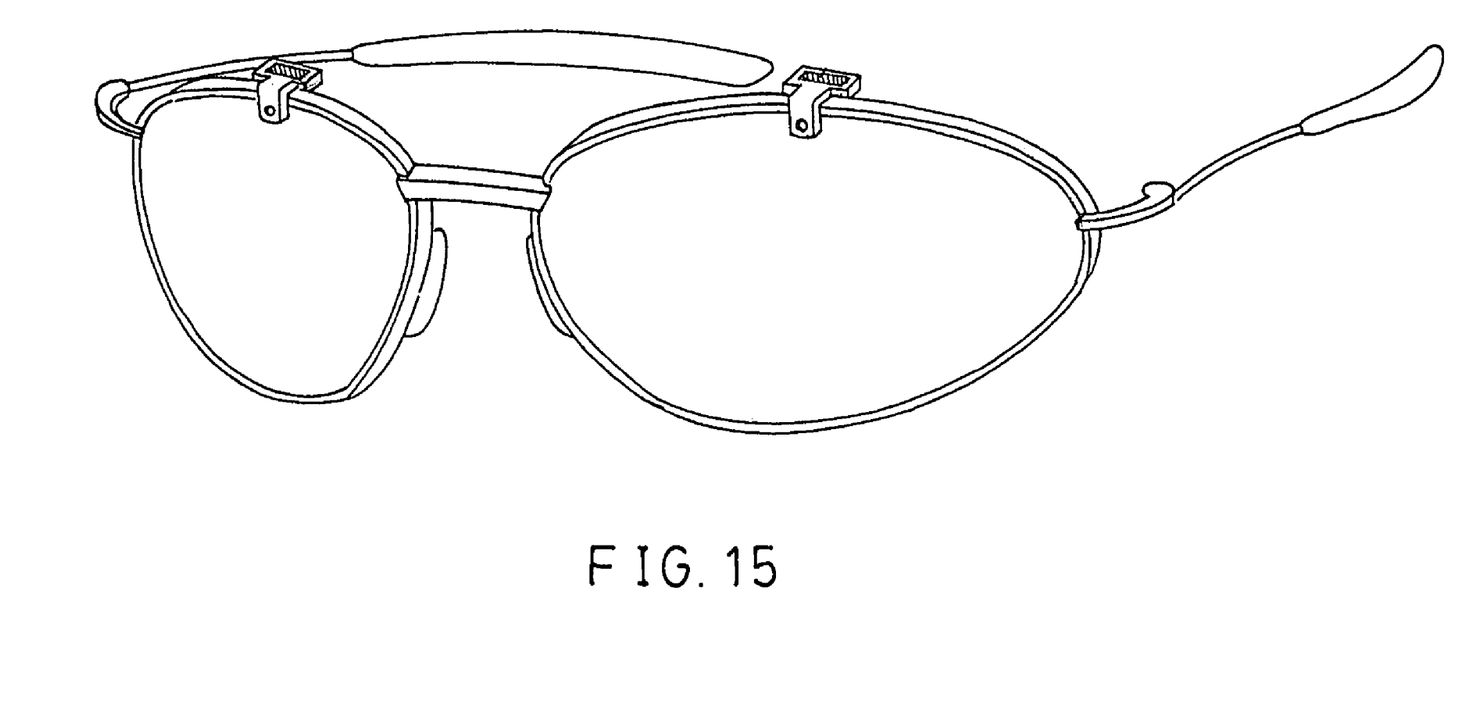
FIG. 15 is a partial perspective view of a tenth preferred embodiment of the present invention.
Figure 16:
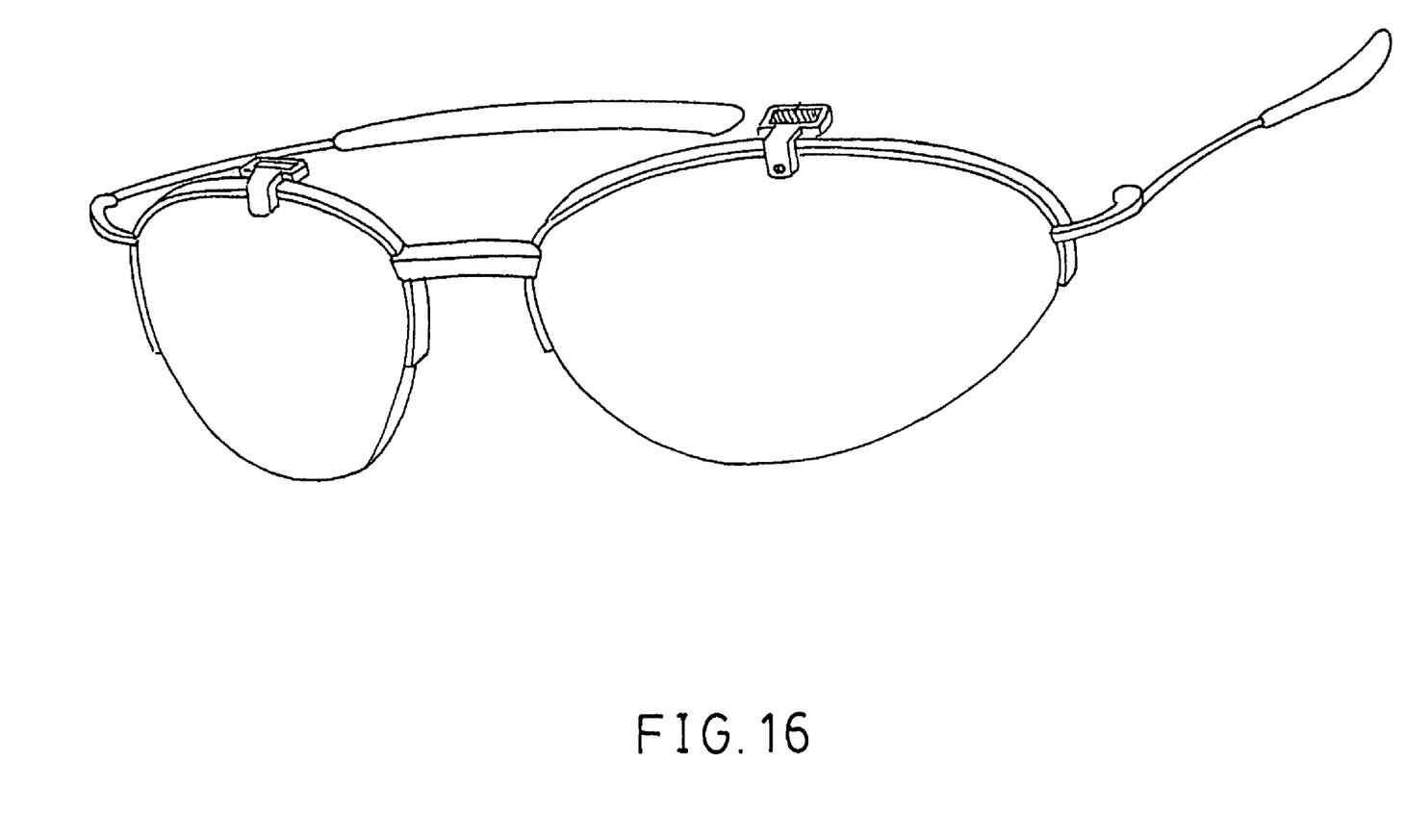
FIG. 16 is a partial perspective view of an eleventh preferred embodiment of the present invention.
Figure 17:
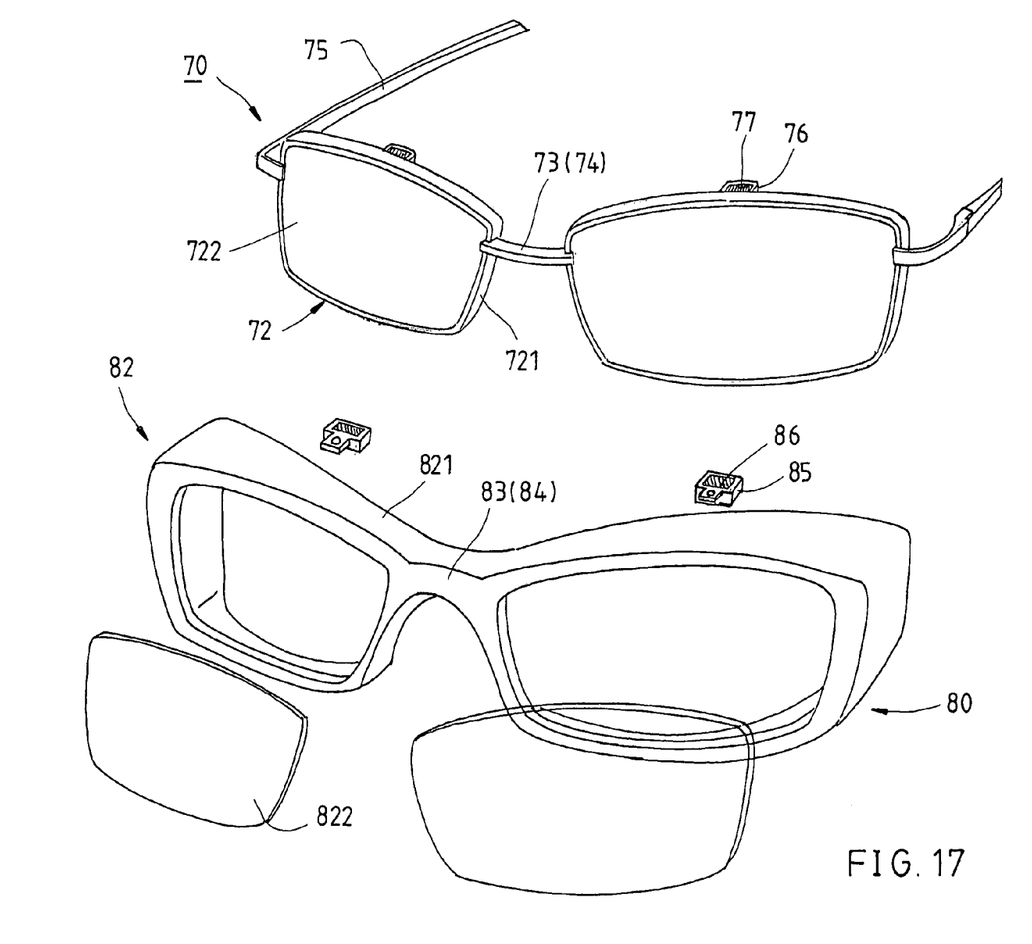
FIG. 17 is an exploded view of a twelfth preferred embodiment of the present invention.
Figure 18:
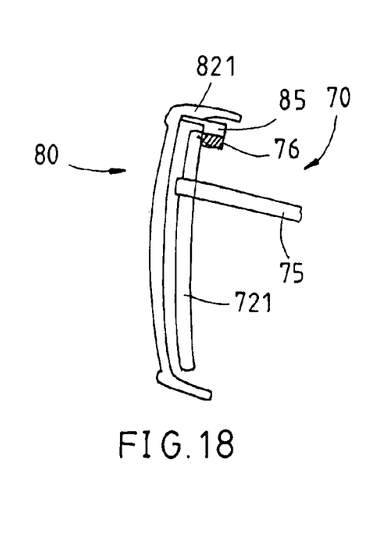
FIG. 18 is a perspective view of the twelfth preferred embodiment of the present invention.

The present invention can also be applied to a full-rim eyeglass device of a tenth preferred embodiment as shown in FIG. 15, a semi-rim eyeglass device of an eleventh preferred embodiment as shown in FIG. 16, a full-mask eyeglass device as shown in FIGS. 17 and 18, or other type of eyeglass device. Further, different types of primary and auxiliary frames or primary and auxiliary lenses can be reciprocally combined.

As shown in FIGS. 17–18, an eyeglass device 70 for combining an auxiliary eyeglass frame is comprised of two lens portions 72, a bridge portion 73 having one or more bridges 74 connected between the two lens portions 72, two temples 75 mounted respectively at outer sides of the two lens portions 72, and two magnetic members 77 disposed respectively on top edges of the two lens portions 72 by two props 77. The magnetic members 77 each have a magnetic surface facing upwards. The lens portions 72 each have a lens 722 and a rim 721 encircling the lens 722. Referring to FIGS. 17-18 again, an auxiliary eyeglass device 80 for combining a primary eyeglass frame comprises two lens portions 82, each of which has a lens 822 and a rim 821 encircling the lens 822, a bridge portion 83 having one or more bridges 84 connected the two lens portions 82, and two magnetic members 86 disposed on top edges of the two lens portions 82 by two props 85. The magnetic members 86 each have a magnetic surface facing downwards to be magnetically attached to the magnetic surface of the primary frame 70 or any kind of primary eyeglass frames having magnetic members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An eyeglass device, comprising:
   two primary rimless lenses interconnected together by a bridge;
   two temples mounted respectively at two ends of said two primary lenses;
   two primary magnetic members disposed respectively on top edges of said two primary lenses by two primary props;
   two auxiliary rimless lenses interconnected together by a bridge; and
   two auxiliary magnetic members disposed respectively on top edges of said two auxiliary lenses by two auxiliary props;
   whereby said primary and auxiliary magnetic members are mutually magnetically attachable to combine said primary and auxiliary lenses together and wherein each of said primary members is located over the top edge of said primary lens.

2. The eyeglass device as defined in claim 1, wherein each of said primary props is threadedly fastened with said primary lens by a bolt.

3. The eyeglass device as defined in claim 2, wherein each of said primary props has a screw hole, each of said primary lenses has a through hole, and each of said bolts runs through said through hole and is threadedly fitted into said screw hole to further combine said primary prop and said primary lens together.

4. The eyeglass device as defined in claim 1, wherein each of said auxiliary props is threadedly fastened with said auxiliary lens by a bolt.

5. The eyeglass device as defined in claim 4, wherein each of said auxiliary props has a screw hole, each of said auxiliary lenses has a through hole, and each of said bolts runs through said through hole and is threadedly fitted into said screw hole to further combine said auxiliary prop and said auxiliary lens together.

6. The eyeglass device as defined in claim 1, wherein each of said primary members is located behind the top edge of said primary lens.

7. The eyeglass device as defined in claim 1, wherein the two primary lenses have a front side and a rear side and wherein the primary magnetic members are only on the rear side of the lenses.

8. An eyeglass device, comprising:
   a primary frame for receiving two primary lenses, said primary frame having a bridge, two brow portions extending outwards from two ends of said bridge, two temples extending rearwards respectively from two distal ends of said two brow portions, and two primary magnetic members disposed respectively on said two brow portions, each of said primary magnetic members having a magnetic surface facing upwards or downwards or rearwards;

two auxiliary lenses interconnected together by a bridge; and two auxiliary magnetic members disposed on top edges of said two auxiliary lenses by two auxiliary props;

whereby said primary and auxiliary magnetic members are mutually magnetically attachable to combine said primary frame and said auxiliary lenses together and wherein each of said primary magnetic members is inlaid into said brow portion of said primary frame.

9. The eyeglass device as defined in claim 8, wherein each of said primary magnetic member is connected to said brow portion of said primary frame by a prop, said prop extending rearwards from said brow portion of said primary frame.

10. The eyeglass device as defined in claim 8, wherein each of said auxiliary props is threadedly fastened to said auxiliary lens by a bolt.

11. The eyeglass device as defined in claim 10, wherein each of said auxiliary props has a screw hole, each of said auxiliary lens has a through hole, and each of said bolts runs through said through hole and is threadedly fitted into said screw hole to combine said auxiliary prop and said auxiliary lens together.

12. The eyeglass device as defined in claim 8, wherein the two brow portions have front and rear sides and wherein the primary magnetic members are only on the rear sides of the brow portions.

13. An eyeglass device, comprising:
two primary rimless lenses interconnected together by a bridge;
two temples mounted respectively at two ends of said two primary lenses;
two primary magnetic members disposed respectively on top edges of said two primary lenses by two primary props; and
an auxiliary frame for receiving two auxiliary lenses, said auxiliary frame having a bridge, two brow portions extending outwards respectively from two ends of said bridge, and two auxiliary magnetic members disposed respectively on said two brow portions;
whereby said primary and auxiliary magnetic members are mutually magnetically attachable to combine said primary lenses and said auxiliary frame together and wherein each of said primary magnetic members is located over the top edge of said primary lens.

14. The eyeglass device as defined in claim 13, wherein each of said primary props is threadedly fastened to said primary lens by a bolt.

15. The eyeglass device as defined in claim 14, wherein each of said primary props has a screw hole; said primary lens has a through hole; each of said bolts runs through said through hole and is threadedly fitted into said screw hole to combine said primary prop and said primary lens.

16. The eyeglass device as defined in claim 13, wherein each of said primary magnetic members is located behind the top edge of said primary lens.

17. The eyeglass device as defined in claim 13, wherein each of said auxiliary magnetic members is connected to said brow portion of said auxiliary frame by a prop, said prop extending rearwards from said brow portion of said auxiliary frame.

18. The eyeglass device as defined in claim 13, wherein the primary lenses have a front side and a rear side and wherein the two primary props extend in a direction toward the rear sides of the primary lenses such that the primary magnetic members are only at the rear, top side of the primary lenses.

* * * * *